(12) United States Patent
Usui

(10) Patent No.: US 8,959,303 B2
(45) Date of Patent: Feb. 17, 2015

(54) INFORMATION PROCESSOR AND MULTI-CORE SYSTEM

(75) Inventor: Hiroyuki Usui, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 657 days.

(21) Appl. No.: 13/205,048

(22) Filed: Aug. 8, 2011

(65) Prior Publication Data

US 2012/0246441 A1 Sep. 27, 2012

(30) Foreign Application Priority Data

Mar. 25, 2011 (JP) ................................. 2011-068367

(51) Int. Cl.
| | |
|---|---|
| G06F 12/00 | (2006.01) |
| G06F 12/10 | (2006.01) |
| G06F 12/14 | (2006.01) |
| G06F 13/00 | (2006.01) |
| G06F 13/28 | (2006.01) |
| G06F 21/50 | (2013.01) |
| G06F 12/02 | (2006.01) |

(52) U.S. Cl.
CPC ............. *G06F 12/10* (2013.01); *G06F 12/14* (2013.01); *G06F 21/50* (2013.01); *G06F 12/0223* (2013.01)
USPC ............. 711/163; 711/207; 710/260; 726/21

(58) Field of Classification Search
CPC ...... G06F 21/50; G06F 12/0223; G06F 12/10
USPC .................. 711/163, 207; 710/260; 726/21
See application file for complete search history.

(56) References Cited

U.S. PATENT DOCUMENTS

| | | | | |
|---|---|---|---|---|
| 3,828,327 | A * | 8/1974 | Berglund et al. | 710/264 |
| 5,910,178 | A * | 6/1999 | Moh et al. | 709/232 |
| 6,374,286 | B1 * | 4/2002 | Gee et al. | 718/108 |
| 8,135,920 | B2 * | 3/2012 | Kreuchauf et al. | 711/152 |
| 2005/0268058 | A1 * | 12/2005 | Drasnin et al. | 711/163 |
| 2008/0047005 | A1 * | 2/2008 | Urata et al. | 726/21 |
| 2009/0019249 | A1 * | 1/2009 | Kessler | 711/170 |

FOREIGN PATENT DOCUMENTS

| | | |
|---|---|---|
| JP | 2008-046969 | 2/2008 |
| JP | 2009-271597 | 11/2009 |

OTHER PUBLICATIONS

Notification of Reason for Rejection mailed Jul. 9, 2013 in connection with related Japanese application No. JP 2011-068367.

* cited by examiner

*Primary Examiner* — Sanjiv Shah
*Assistant Examiner* — Mark Giardino, Jr.
(74) *Attorney, Agent, or Firm* — Knobbe, Martens, Olson & Bear, LLP

(57) ABSTRACT

According to one embodiment, an information processor includes an operator and an address protector. The address protector includes a register access interface, an address table, and an access determination module. The register access interface is configured to receive address protection information from the operator. The address table is configured to store the received address protection information. The access determination module is configured to determine whether an access to an address specified by the operator is allowable based on the address protection information, and configured to output an interrupt signal to the operator when the access is unallowable.

11 Claims, 14 Drawing Sheets

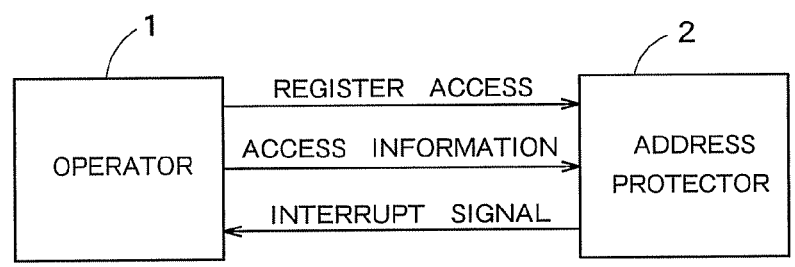
F I G. 1

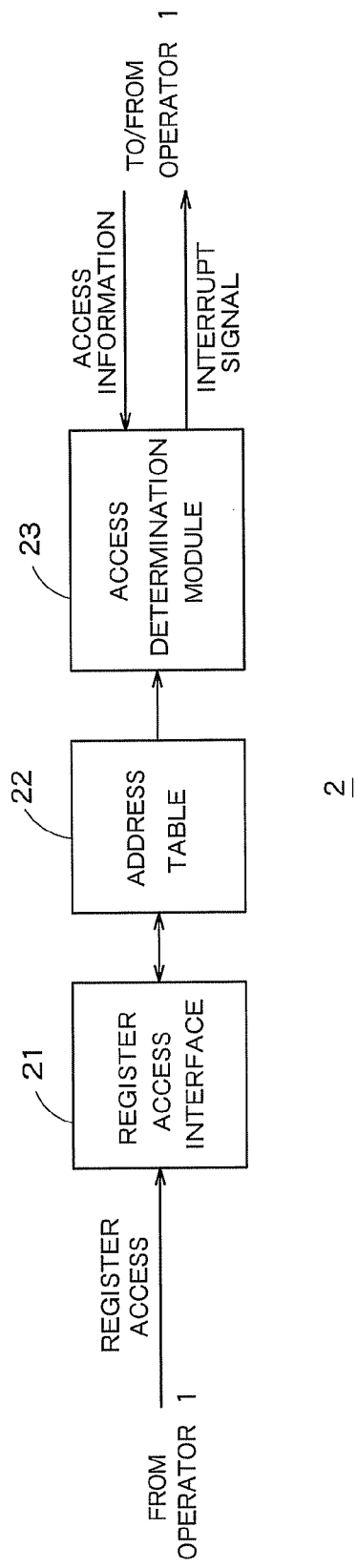
F I G. 2

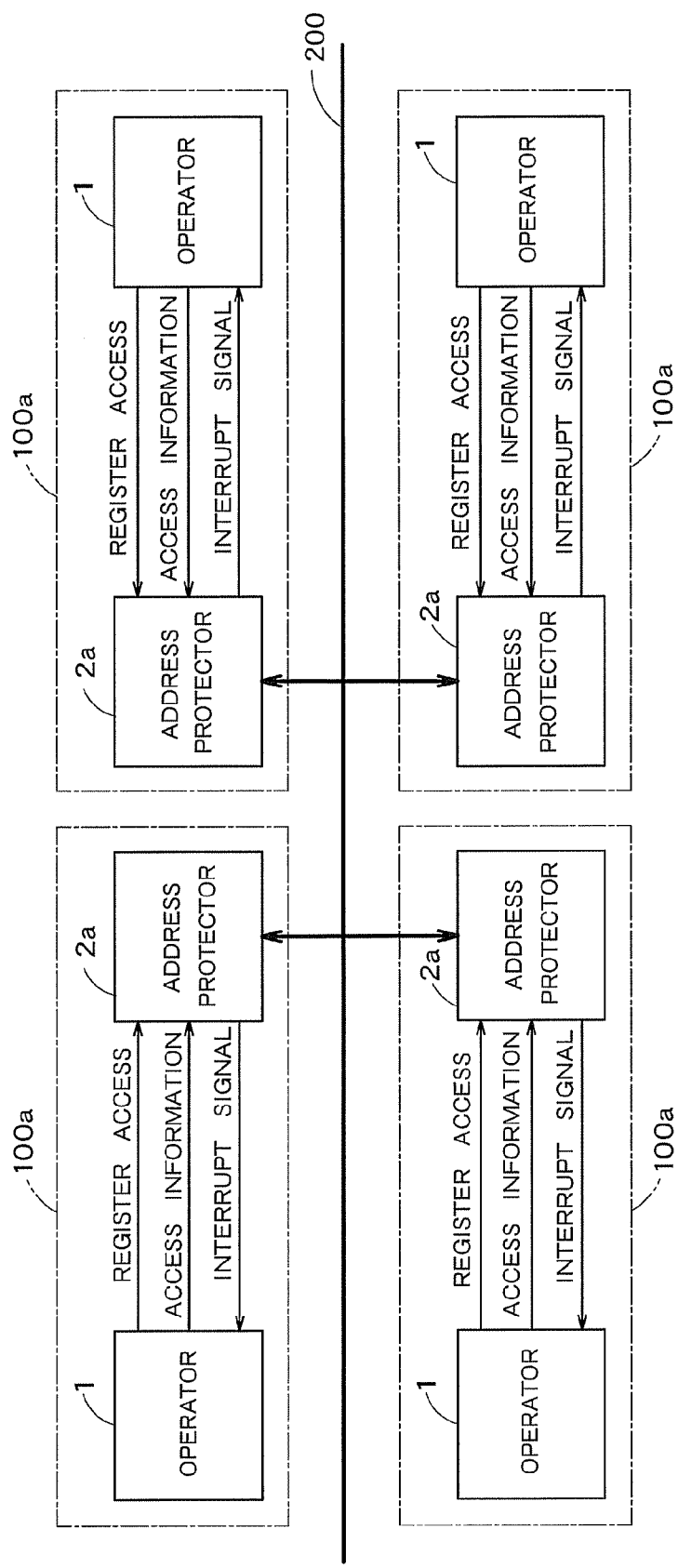
F I G. 8

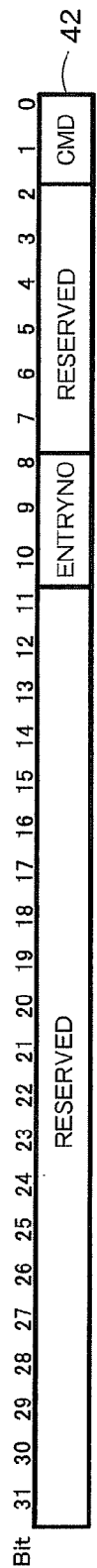
F I G. 10

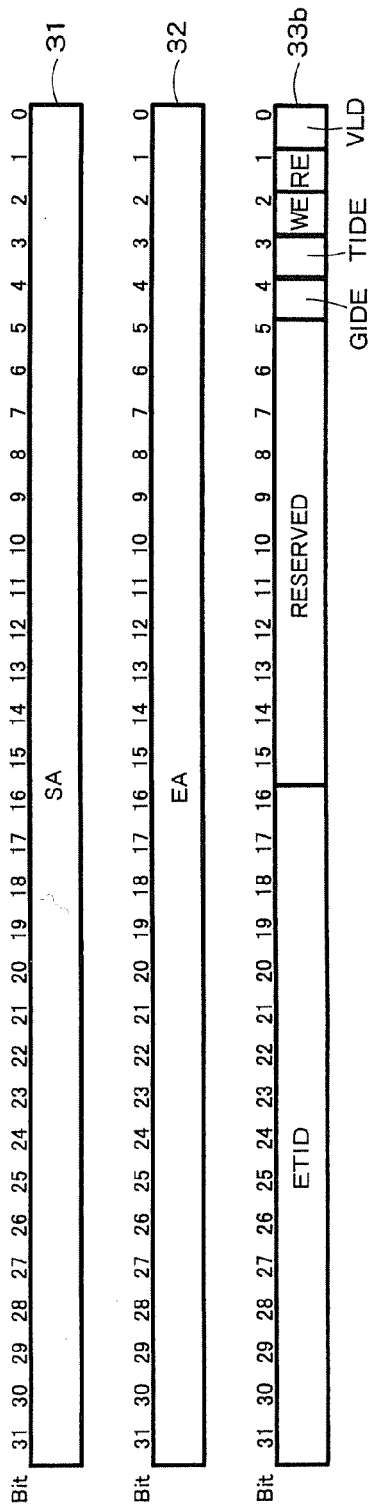
F I G. 13

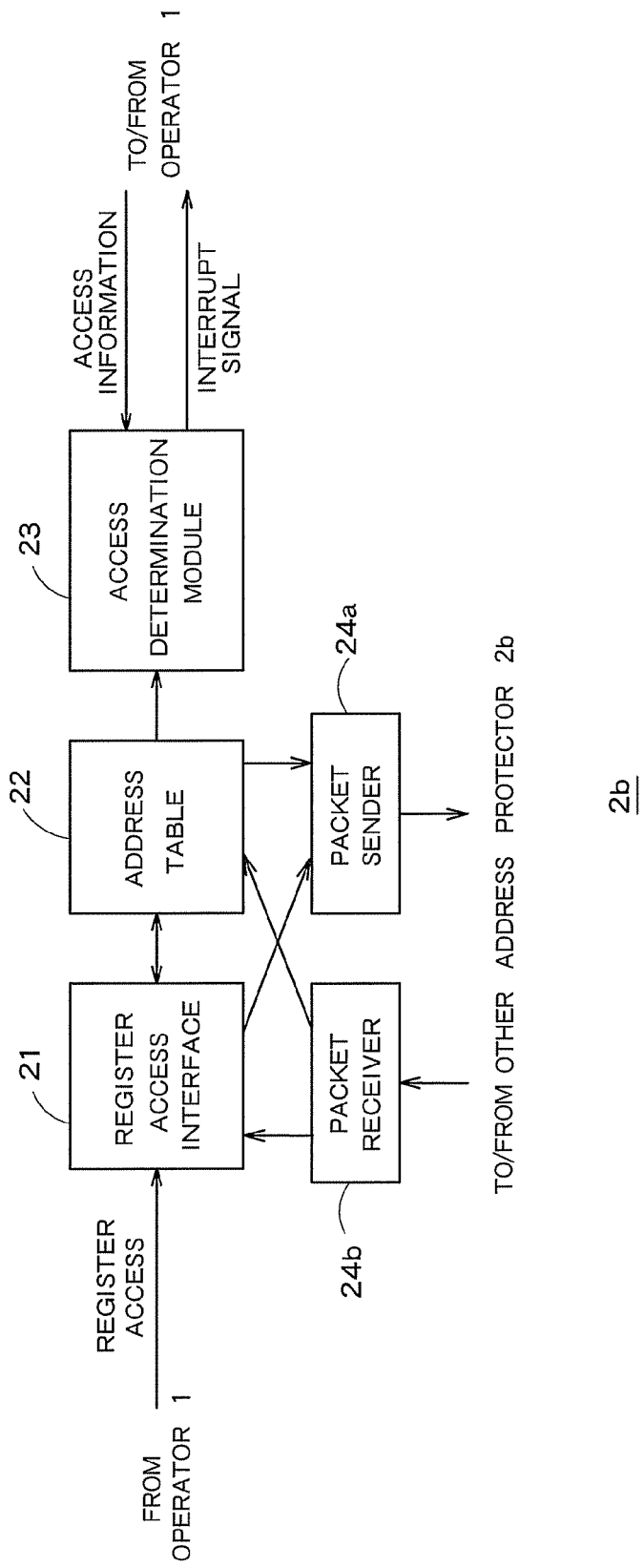
F I G. 14

INFORMATION PROCESSOR AND MULTI-CORE SYSTEM

CROSS REFERENCE TO RELATED APPLICATIONS

This application is based upon and claims the benefit of priority from the prior Japanese Patent Application No. 2011-68367, filed on Mar. 25, 2011, the entire contents of which are incorporated herein by reference.

FIELD

Embodiments described herein relate generally to an information processor and a multi-core system.

BACKGROUND

In personal computers of recent years, a multi-core system is used where a memory or a cache is shared among a plurality of operating devices. This makes it possible to efficiently use memory resource since a memory or a cache can be accessed by a plurality of cores. In the multi-core system, a plurality of programs operate in the same address space, and thus the address space has to be appropriately protected.

BRIEF DESCRIPTION OF THE DRAWINGS

FIG. 1 is a schematic block diagram of an information processor 100 according to a first embodiment.

FIG. 2 is a schematic block diagram showing the internal configuration of the address protector 2.

FIG. 8 is a schematic block diagram of the multi-core system.

FIG. 9 is a schematic block diagram showing the internal configuration of the address protector 2a.

FIG. 10 is a diagram showing the structure of a control register 42 for sharing the address information stored in the address table 22.

FIG. 13 is a diagram showing an example of the address protection information stored in the address table 22.

FIG. 14 is a schematic block diagram showing the internal configuration of an address protector 2b.

DETAILED DESCRIPTION

Figure 3:
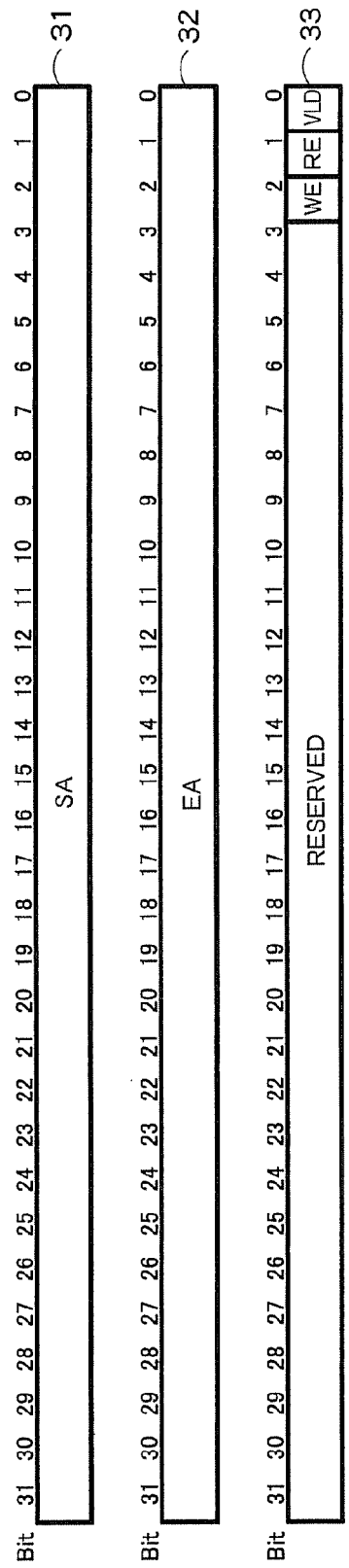
FIG. 3 is a diagram showing an example of the address protection information stored in the address table 22.

In general, according to one embodiment, an information processor includes an operator and an address protector. The address protector includes a register access interface, an address table, and an access determination module. The register access interface is configured to receive address protection information from the operator. The address table is configured to store the received address protection information. The access determination module is configured to determine whether an access to an address specified by the operator is allowable based on the address protection information, and configured to output an interrupt signal to the operator when the access is unallowable.

Embodiments will now be explained with reference to the accompanying drawings.

First Embodiment

FIG. 1 is a schematic block diagram of an information processor 100 according to a first embodiment. The information processor 100 has an operator 1 and an address protector 2. Further, a cache or a memory (not shown) is provided, and the operator 1 specifies a predetermined address to access (to write into or read from) these units.

The operator 1, which is a CPU (Central Processing Unit) for example, achieves register access to the address protector 2 to set, in the address protector 2, address protection information indicative of whether or not the access to a certain address is allowable. When the address protector 2 receives, from the operator 1, access information, namely, an inquiry about whether or the access to a certain address is allowable, the address protector 2 determines whether or not the access to the specified address is allowable based on the set address protection information. When the access is determined to be unallowable, the address protector 2 sends an interrupt signal to the operator 1. By receiving the interrupt signal, the operator 1 can find that the operator 1 has tried to access an access-unallowable address.

FIG. 2 is a schematic block diagram showing the internal configuration of the address protector 2. The address protector 2 has a register access interface 21, an address table 22 and an access determination module 23.

Based on the register access received from the operator 1, the register access interface 21 writes the address protection information in the address table 22. When the access determination module 23 receives the access information from the operator 1, the access determination module 23 determines whether or not the access is allowable based on the address protection information set in the address table 22. When the access is determined to be unallowable, the access determination module 23 sends the interrupt signal to the operator 1.

FIG. 3 is a diagram showing an example of the address protection information stored in the address table 22. The address protection information includes first to third fields 31 to 33 each consisting of 32 bits, for example.

Set in the first field 31 is a start address SA of the address space access to which is forbidden. Set in the second field 32 is an end address EA of the address space access to which is unallowable. As for the third field 33, set in the 3rd bit is information WE (Write Enable, first information) indicative of whether or not write access is allowable, and set in the 2nd bit is information RE (Read Enable, second information) indicative of whether or not read access is allowable. When the each of the above bits is set to be high, the access is allowable, and when set to be low, the access is unallowable. Further, set in the first bit of the third field 33 is information VLD indicative of whether the address protection information set in the first to third fields 31 to 33 is valid. When the information VLD is set to be high, the address protection information is valid, and when set to be low, the address protection information is invalid. Note that the other bits represented as "RESERVED" are not used in the present embodiment.

For example, when forbidding write access to an address space of 0x1000_0000 to 0x2000_0000, the operator 1 achieves register access to set SA=0x1000_0000, EA=0x2000_0000, WE=0, RE=1, and VLD=1 as the address protection information.

The address table 22 may store a plurality of sets of first to third fields 31 to 33, which makes it possible to set address protection information on a plurality of address spaces.

Figure 4:
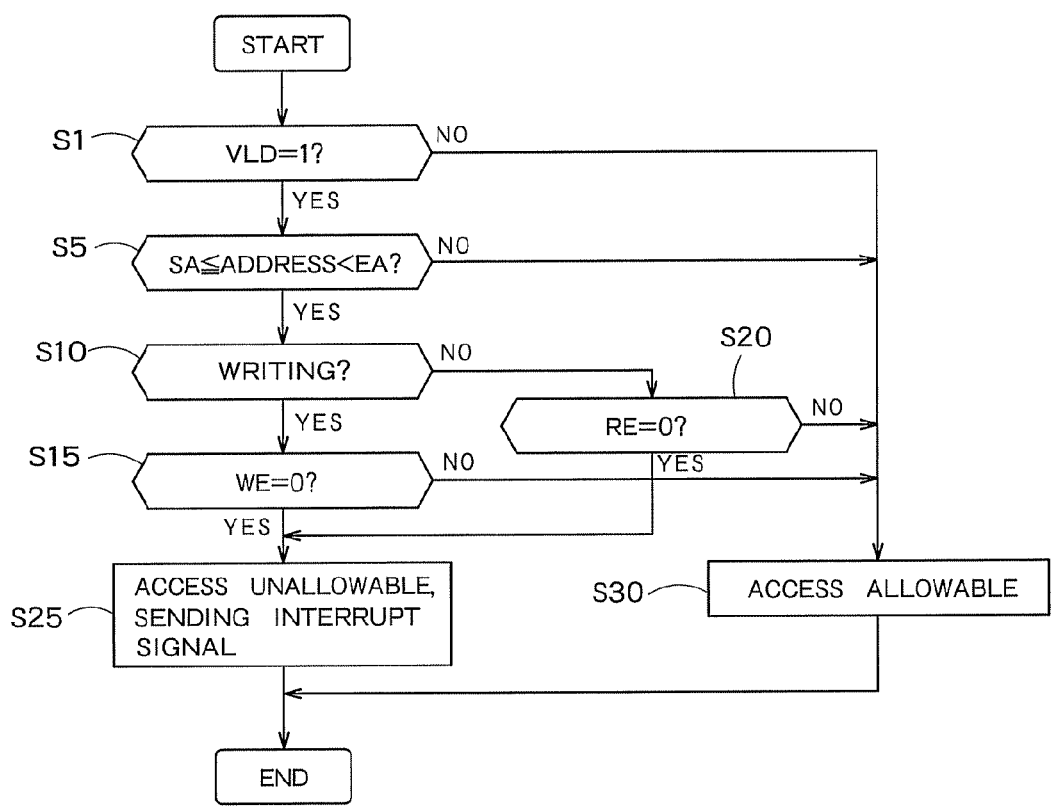
FIG. 4 is a flowchart showing an example of the processing operation of the address protector 2.

FIG. 4 is a flowchart showing an example of the processing operation of the address protector 2. Here, assume that address protection information is set in the address table 22 in advance.

When receiving access information from the operator 1, the access determination module 23 checks the information VLD included in the third field 33 in the address table 22 (S1). If VLD=0 (NO at S1), the address protection information is invalid, and thus the access determination module 23 determines the access to be allowable (S30). On the other hand, if VLD=1 (YES at S1), the access determination module 23 refers to the address table 22 to confirm whether or not the specified address is included between the start address SA and the end address EA (S5).

If not included (NO at S5), the specified address is not included in the address space to which the access is unallowable, and thus the access determination module 23 determines the access to be allowable (S30). On the other hand, if included (YES at S5), when the access is write access (YES at S10) and WE=0 (YES at S15), or when the access is read access (NO at S10) and RE=0 (YES at S20), the access is the one to the address space to which the access is unallowable. Thus, the access determination module 23 determines the access to be unallowable, and sends an interrupt signal to the operator 1 (S25). In the other cases, the access determination module 23 determines the access to be allowable (S30).

Note that the order of determination steps in FIG. 4 may be properly rearranged. As stated above, the address protector 2 can determine whether or not the access specified in the access information from the operator 1 is allowable. For example, when the address protection information is set as stated above, write access to address 0x1800_0000 is determined to be unallowable by YES at S1, YES at S5, YES at S10, and YES at S15 (S25). Further, read access to address 0x1800_0000 is determined to be allowable by YES at S1, YES at S5, NO at S10, and NO at S20 (S30). Further, write access to address 0x2300_0000 is determined to be allowable by YES at S1 and NO at S5 (S30).

As stated above, in the first embodiment, the address protection information is set in the address table 22 in advance to determine whether or not access to the address specified by the operator 1 is allowable, thereby protecting the address space appropriately. Further, when the access is unallowable, an interrupt signal is generated, thereby detecting unallowable access simply.

Second Embodiment

The operator 1 can simultaneously execute a plurality of tasks (e.g., audio and visual processing) In this case, it is occasionally desired to allow access when one task is executed while forbidding access when the other tasks are executed. Accordingly, a second embodiment is made to protect the address space for a specific task.

Figure 5:
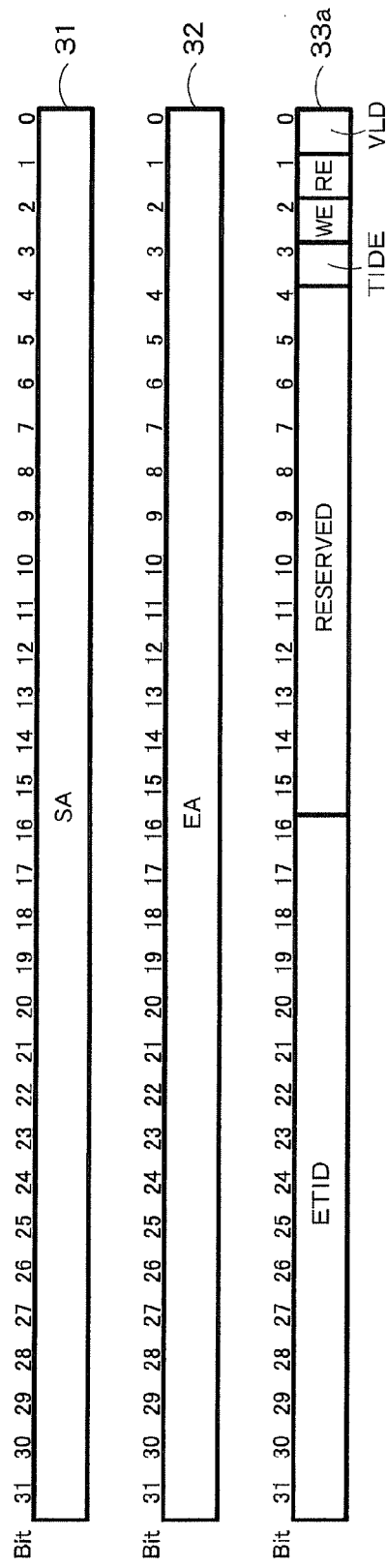
FIG. 5 is a diagram showing an example of the address protection information stored in the address table 22.

FIG. 5 is a diagram showing an example of the address protection information stored in the address table 22. The address protection information includes the first and second fields 31 and 32 similar to FIG. 3 and a third field 33a different from FIG. 3. As for the third field 33a, set in the 17th to 32nd bits is an identification number ETID (Enabled Task ID) of the task allowed to access, and set in the fourth bit is information TIDE indicative of whether or not to perform task-based address protection. The identification number of the task is uniquely assigned to each task.

Figure 6:
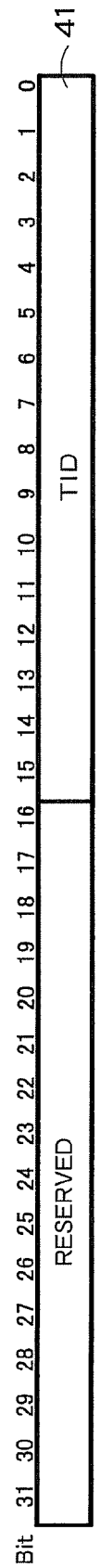
FIG. 6 is a diagram showing the structure of a control register 41 for performing task-based address protection.

FIG. 6 is a diagram showing the structure of a control register 41 for performing task-based address protection. In addition to the address protection information of FIG. 5, the address table 22 stores the value set in the control register 41. Set in the first to 16th bits of the control register 41 is an identification number TID of the task currently executed by the operator 1.

For example, when the operator 1 is executing a task having an identification number "0" and a task having an identification number "1", the operator 1 achieves register access to update the identification number TID to "0" or "1" corresponding to the task currently executed every time the executed task is switched. Then, when only the task having the identification number "0" is allowed to write into and read from an address space of 0x1000_0000 to 0x2000_0000, for example, the operator 1 achieves register access to set the address protection information specifying that SA=0x1000_0000, EA=0x2000_0000, ETID=0, TIDE=1, WE=1, RE=1, and VLD=1.

Figure 7:
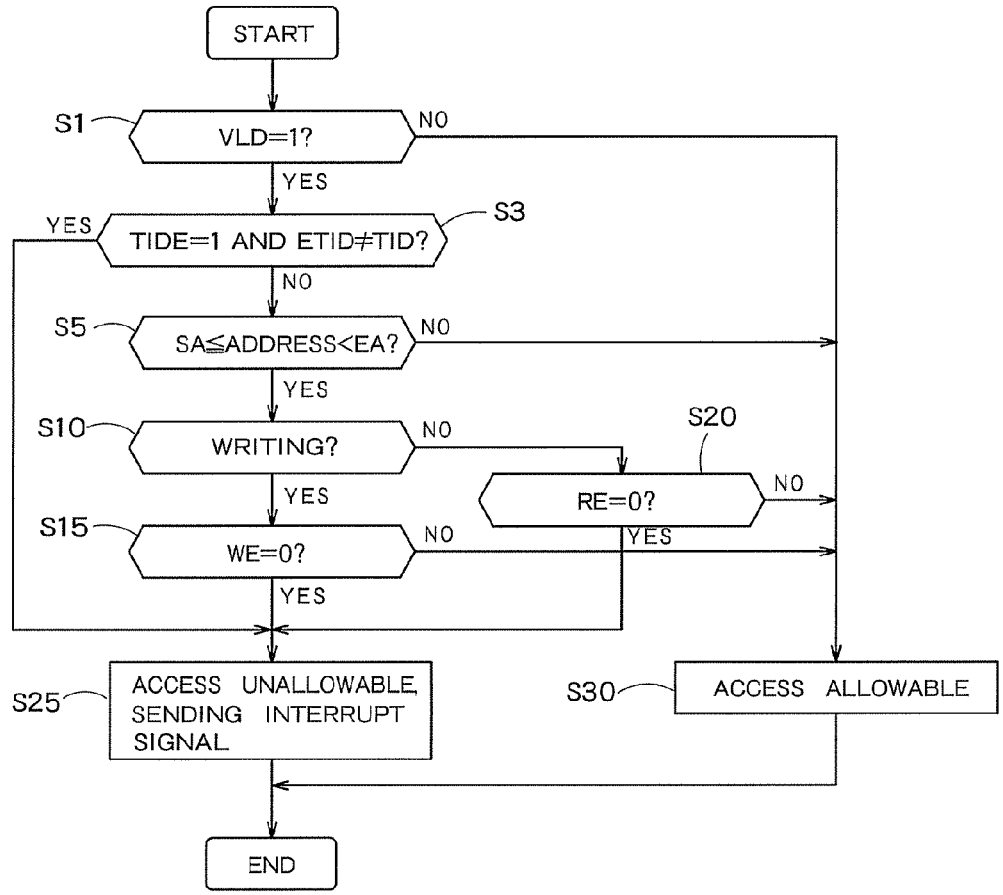
FIG. 7 is a flowchart showing an example of the processing operation of the address protector 2.

FIG. 7 is a flowchart showing an example of the processing operation of the address protector 2. Hereinafter, differences from FIG. 4 will be mainly explained. When VLD=1 (YES at S1), if TIDE=1 and the identification number TID of the task currently executed is not coincident with the identification number ETID of the task allowed to access (YES at S3), the task currently executed is not allowed to access, and thus the access is determined to be unallowable and an interrupt signal is sent to the operator 1 (S25). In the other cases (NO at S3), more specifically, when the task-based address protection is not performed (TIDE=0) and when the task-based address protection is performed and the task currently executed is allowed to access (TIDE=1 and ETID=TID), the access determination module 23 determines whether or not the access is allowable by executing steps S5 to S20 similarly to FIG. 4.

For example, when the address protection information is set as stated above and TID=0, read access to address 0x1800_0000 is determined to be allowable by YES at S1, NO at S3, YES at S5, NO at S10, and NO at S20 (S30). Further, write access to address 0x1800_0000 is determined to be allowable by YES at S1, NO at S3, YES at S5, YES at S10, and NO at S15 (S30). Further, when TID=1, both write and read accesses to any address is determined to be unallowable by YES at S1 and YES at S3 (S25).

As stated above, in the second embodiment, the identification number of the task allowed to access is included in the address protection information. Therefore, even when the operator 1 executes a plurality of tasks, access from one task can be allowed and that from other tasks can be forbidden, and the address space is appropriately protected depending on tasks.

Third Embodiment

A third embodiment is made to share the address protection information in a multi-core system having a plurality of information processors.

FIG. 8 is a schematic block diagram of the multi-core system. The multi-core system has a plurality of information processors 100a each having the operator 1 and an address protector 2a, and a bus 200 for performing data communication among them.

Figure 9:
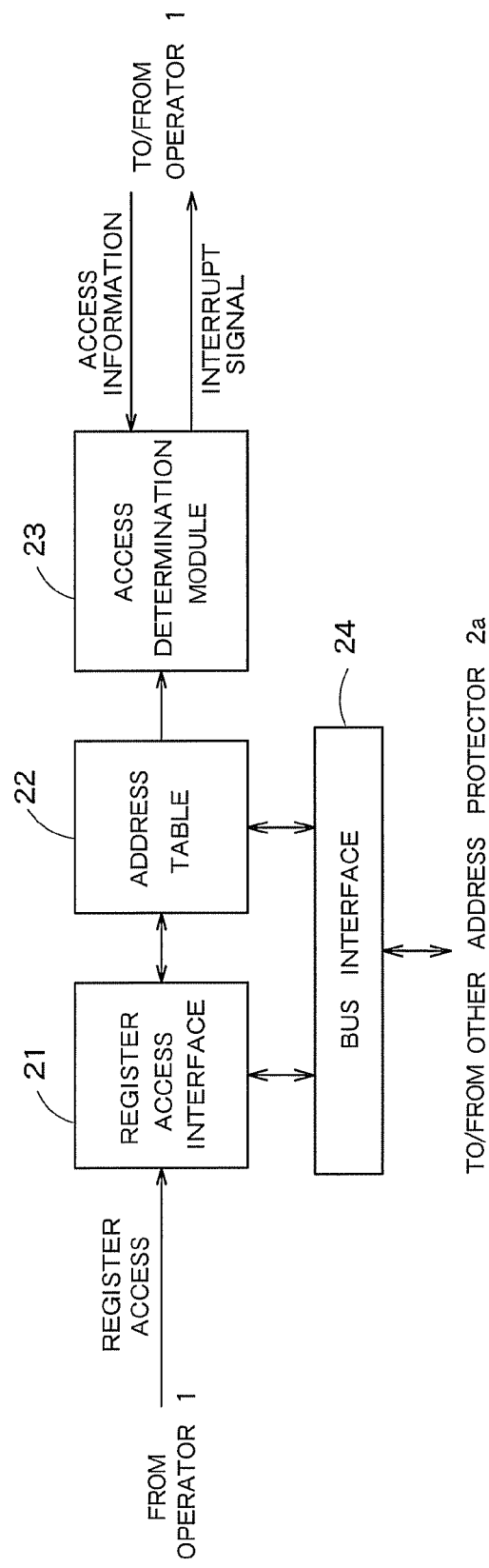

FIG. 9 is a schematic block diagram showing the internal configuration of the address protector 2a. In FIG. 9, the same components as those in FIG. 2 are given the same symbols, and differences therebetween will be mainly explained. The address protector 2a further has a bus interface (transceiver) 24. The bus interface 24 is provided to transmit the address protection information stored in the address table 22 to the address protectors 2a of other information processors 100a, and to receive the address protection information from the other address protectors 2a.

FIG. 10 is a diagram showing the structure of a control register 42 for sharing the address information stored in the address table 22. In the example shown in the third embodiment, eight sets of address protection information can be set in the address table 22. As for the control register 42, set in the 9th to 11th bits is a number ENTRYNO indicative of one of the eight sets to be shared, and set in the 1st and 2nd bits is a command CMD indicative of the start of sharing.

When register access is achieved by the operator 1 and the command CMD is set to 0b01, namely when the 2nd bit of the control register 42 is set to low and its 1st bit is set to high, the bus interface 24 transmits address protection information to be shared corresponding to the number ENTRYNO to the address protectors 2a of all of the other information processors 100a through the bus 200.

On the other hand, the register access interface 21 having received the address protection information in the information processor 100a sets the received address protection information in its own address table 22. In this way, the address protection information can be shared among a plurality of information processors 100a. For example, when an address space of 0x1000_0000 to 0x2000_0000 of an internal cache (not shown) in one information processor 100a is desired to be exclusively written, the address protection information is firstly set as SA=0x1000_0000, EA=0x2000_0000, WE=0, RE=1, and VLD=1 in its address table 22. Then, the information processor 100a transmits this address protection information to the other information processors 100a to share it. After that, the information WE is updated to "1", which is not transmitted to the other information processors 100a.

Figure 11:
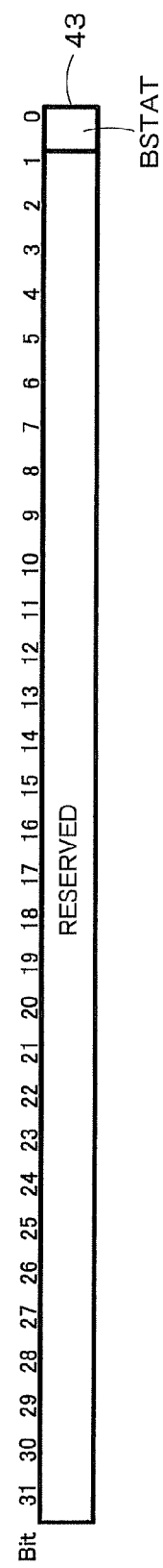
FIG. 11 is a diagram showing the structure of a control register 43.

Incidentally, access to the address is not forbidden until the transmitted address protection information is received by the other information processors 100a. Accordingly, the address table 22 may further store a control register 43 shown in FIG. 11. Set in the 1st bit of the control register 43 is information BSTAT indicating that the address protection information is transmitted to the other information processors 100a. The information BSTAT is usually set to low, but set to high when the bus interface 24 transmits the address protection information. In the period when the information BSTAT is high, there is a possibility that the address protection information has not been completely shard and the address cannot be appropriately protected. Therefore, access to the address space set by the address protection information is unallowable.

On the other hand, when the register access interface 21 of the information processor 100a having received the address protection information sets the received address protection information in its address table 22, the register access interface 21 transmits a receipt acknowledgement to the information processor 100a on the transmitting side through the bus interface 24. Corresponding thereto, the information processor 100a on the transmitting side sets the information BSTAT of the control register 43 to low. In this way, sharing operation of the address protection information is completed, and the access to the address space is made possible.

As stated above, in the third embodiment, by sharing the address protection information, address space can be efficiently and appropriately protected by a plurality of information processors 100a. Further, instead of sharing the address protection information among a plurality of information processors 100a on every access occasion, the address protection information to be shared is transmitted from one information processor 100a to the other information processors 100a in advance, by which communication volume among the information processors 100a can be restrained.

Fourth Embodiment

In the third embodiment, the address protection information is shared among all of the information processors 100a. On the other hand, because a plurality of information processor may operate in the same logical address space having different physical addresses, a fourth embodiment is made to share an address space among a part of information processors 100a.

Figure 12:
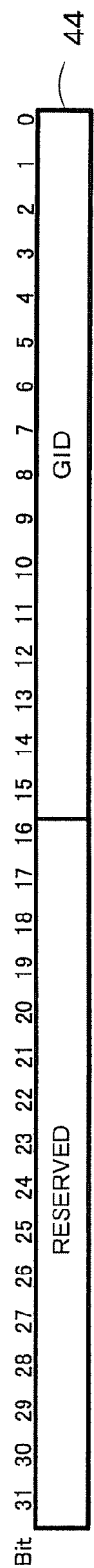
FIG. 12 is a diagram showing the structure of a control register 44.

FIG. 12 is a diagram showing the structure of a control register 44 for sharing an address space among a part of information processors 100a. Set in the 1st to 16th bits of the control register 44 is an identification number GID (Group ID), which is common to the information processors 100a sharing the address protection information.

Further, FIG. 13 is a diagram showing an example of the address protection information stored in the address table 22. The address protection information includes a third field 33b shown in FIG. 13, instead of the third field 33 (33a) in FIG. 3 or FIG. 5. Set in the 5th bit of the third field 33b is information GIDE indicating that the address protection information is shared among a part of information processors 100a. More specifically, the address information is shared among a part of information processors 100a when the information GIDE is set to high, and shared among all of the information processors 100a when the information GIDE is set to low. Note that the task identification number ETID and information TIDE in the third field 33b may be omitted.

In addition to the address protection information including the first to third fields 31 to 33b, the information processor 100a transmits the identification number GID. For example, one information processor 100a transmits the identification number GID set to "2" and address protection information specifying that SA=0x1000_0000, EA=0x2000_0000, GIDE=1, WE=0, RE=1, and VLD=1, the register access interface 21s in information processors 100a whose control register 44 has the identification number GID set to "2" sets the received address protection information in its own address table 22. On the other hand, information processors 100a having the identification number GID not set to "2" destroys the received address information.

Therefore, for example, write access to address 0x1800_0000 is unallowable in the other information processors 100a having the identification number GID set to "2", but allowed in the other information processors 100a having the identification number GID not set to "2".

As stated above, in the fourth embodiment, by transmitting and receiving address protection information including the identification number GID common to the information processors 100a sharing the address protection information, address information can be appropriately protected by a part of information processors 100a. Further, instead of transmitting the address protection information selectively transmitted only to the information processors 100a sharing the address protection information, information processor 100a can determine whether the received address protection information should be set or destroyed, which makes it possible to simplify the structure of the address protector 2a.

Fifth Embodiment

In the third and fourth embodiments, the bus interface 24 is arranged to transmit and receive the address protection information through the bus 200. On the other hand, in a fifth embodiment, packetized address protection information is transmitted and received.

FIG. 14 is a schematic block diagram showing the internal configuration of an address protector 2b. The address protector 2b has a packet sender 24a and a packet receiver 24b functioning as a transceiver, instead of the bus interface 24 of FIG. 8.

The packet sender 24a packetizes the address protection information and transmits a broadcast packet to a packetized network. The packet includes header for storing destination information, body for storing data, and tailer for indicating the termination of the body. The address protection information is stored in the body and tailer. The packet receiver 24b decodes the received packet, and sets the address protection information included in the packet in the address table 22.

As stated above, in the fifth embodiment, it is not unnecessary to provide a dedicated bus for transmitting and receiving the address protection information, thereby reducing in implementation cost. Further, since communication is locally performed in the packetized network, influence on the entire performance of the multi-core system can be reduced compared to a case where the bus is arranged.

At least a part of the multi-core system explained in the above embodiments can be formed of hardware or software. When the multi-core system is partially formed of the software, it is possible to store a program implementing at least a partial function of the multi-core system in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the multi-core system can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. A multi-core system comprising a plurality of information processors each information processor comprising an operator and an address protector, the address protector comprising:
    a register access interface configured to receive address protection information from the operator, wherein the address protection information further comprises second identification information associated with a second task allowed access to the address;
    an address table configured to:
        store the address protection information; and
        store first identification information associated with a first task currently executed by the operator; and
    an access determination module configured to:
        determine whether access to an address specified by the operator is allowed based on the address protection information;
        output an interrupt signal to the operator when the access is not allowed, wherein the address protectors are respectively connected to a bus in order to communicate with each other; and
        determine that access to the address specified by the operator is not allowed when the first identification information associated with the first task is not coincident with the second identification information associated with the second task allowed access to the address, wherein the address protection information comprises:
            a start address of an address space to which access is not allowed;
            an end address of the address space to which access is not allowed;
            first information indicative of whether write access to the address space is allowed; and
            second information indicative of whether read access to the address space is allowed.

2. The multi-core system of claim 1, wherein the access determination module is further configured to determine that access to the address specified by the operator is not allowed when:
    the address specified by the operator is included in the address space to which the access is not allowed; and
    the access by the operator is at least one of: a write access and the first information indicates that write access is not allowed; and a read access and the second information indicates that read access is not allowed.

3. The multi-core system of claim 1, wherein the address protector further comprises a transceiver configured to transmit the address protection information to another information processor and to receive the address protection information inputted from another information processor.

4. The multi-core system of claim 3, wherein the address table is further configured to store information indicative of transmission of the address protection information.

5. The multi-core system of claim 4, further comprising a second transceiver associated with a second information processor of the plurality of information processors, and wherein, in response to receiving the address protection information from a first information processor of the plurality of information processors, the second information processor is configured to transmit a signal to the first information processor indicative of having received the address protection information.

6. The multi-core system of claim 3, wherein the transceiver is further configured to transmit identification information common to the plurality of information processors sharing the address protection information to a subset of the plurality of information processors.

7. The multi-core system of claim 6, wherein the address table is further configured to store the identification information, and wherein the multi-core system further comprises:
    a second register access interface associated with a second information processor from the plurality of information processors, where
    the second information processor, in response to receiving a first identification information and the address protection information from a first information processor of the plurality of information processors, is configured to store the address protection information in a second address table of the second information processor when the first identification information is coincident with a second identification information stored in the second address table of the second information processor.

8. The multi-core system of claim 6, wherein the address table stores an identification information in common among the plurality of information processors sharing the address protection information, and
- if the identification information indicates one of the address protectors when the one of the address protectors receives the address protection information including the identification information, the one of the address protectors sets the received address protection information to its own address table,
- if the identification information does not indicate one of the address protectors when the one of the address protectors receives the address protection information including the identification information, the one of the address protectors destroys the received address protection information.

9. The multi-core system of claim 3, wherein the transceiver is further configured to packetize the address protection information and to transmit the packetized address protection information.

10. The multi-core system of claim 1, wherein the address protector further comprises a transceiver configured to transmit the address protection information and to receive the address protection information.

11. The multi-core system of claim 10, wherein the address table stores a number indicative of the address protection information to be shared by the plurality of information processors, and
- one of the address protectors transmits the address protection information corresponding to the number, when the one of the address protectors sets a command indicative of the start of sharing.

\* \* \* \* \*